US 6,685,191 B2

(12) United States Patent
Toal

(10) Patent No.: US 6,685,191 B2
(45) Date of Patent: Feb. 3, 2004

(54) MECHANICAL SEAL FOR ROTATING SHAFT

(75) Inventor: Keith R. Toal, Hiawatha, IA (US)

(73) Assignee: A. W. Chesterton Company, Stoneham, MA (US)

( * ) Notice: Subject to any disclaimer, the term of this patent is extended or adjusted under 35 U.S.C. 154(b) by 175 days.

(21) Appl. No.: 09/779,820

(22) Filed: Feb. 8, 2001

(65) Prior Publication Data

US 2001/0045701 A1 Nov. 29, 2001

Related U.S. Application Data

(60) Provisional application No. 60/181,805, filed on Feb. 11, 2000.

(51) Int. Cl.[7] .................................................. F16J 15/34
(52) U.S. Cl. ......................... 277/370; 277/352; 277/375
(58) Field of Search ................................ 277/352, 371, 277/375, 361, 616, 620, 370

(56) References Cited

U.S. PATENT DOCUMENTS 4,457,517 A  *  7/1984  Dunegan
5,344,164 A  *  9/1994  Carmody et al.
5,489,105 A  *  2/1996  Attenasio et al.
6,003,875 A  * 12/1999  Ellis et al.
6,231,052 B1 *  5/2001  Forlander
6,357,753 B1 *  3/2002  Yamasaki et al.

\* cited by examiner

*Primary Examiner*—Anthony Knight
*Assistant Examiner*—Enoch E Peavey
(74) *Attorney, Agent, or Firm*—Lahive & Cockfield, LLP

(57) ABSTRACT

An improved mechanical seal for a pump includes a seal cartridge slidably received inside an end plate. The cartridge includes an outer cylindrical stator member which is slidably received in the end plate and an inner cylindrical rotor which is rotatable within the stator member. The stator member is prevented from rotation in the end plate. The stator member includes a shoulder which extends outwardly over the end plate and is captured between the end plate and the housing of the pump. A clinching collar is fixed to the rotor member and retains the rotor member of the cartridge to the pump shaft. The clinching collar may pass through the end plate while attached to the rotor member and pump shaft. Lubricating passageways in the end plate allow lubricants to circulate past the seal cartridge bearing surfaces.

20 Claims, 4 Drawing Sheets

MECHANICAL SEAL FOR ROTATING SHAFT

CROSS-REFERENCE TO RELATED APPLICATIONS

This application claims the benefit under 35 U.S.C. §119 (e) and 37 C.F.R. §1.78 of U.S. provisional patent application Ser. No. 60/181,805 filed Feb. 11, 2000. The contents of Ser. No. 60/181,805 are incorporated in this application.

STATEMENT REGARDING FEDERALLY SPONSORED RESEARCH OR DEVELOPMENT

Not Applicable.

BACKGROUND OF THE INVENTION

In the use of pumps or other rotating shaft machinery in which liquids or emulsions are present, it is necessary to prevent leakage of the liquids or emulsions from the machine. In early applications, rope or cordage was stuffed around the drive shaft to create a seal. Later, mechanical seals were developed which include a member locked to the rotating shaft and rotatable within a stationary mounting flange mounted to the body of the machine. The seal is achieved by attaching a bearing face to the shaft and another bearing face to the housing of the equipment with each face mechanically loaded against the other to form a seal between the rotating member and the mounting flange. A fluid is used to lubricate and cool the faces to avoid destruction due to friction between the two parts.

Conventional seals are longitudinally compressed and longitudinally fixed within the mounting flange which is mounted to the pump body. A collar having multiple radially disposed screws is typically used to attach the rotating parts of the seal to the driven shaft. When the bearing surfaces of such mechanical seals become worn, it is necessary to remove the entire seal and mounting flange assembly and either discard the assembly or return the entire assembly to a repair facility for refurbishing. That is, prior art seals are not typically amenable to disassembly in the field of the bearing components from the mounting end plate. Because of this, users of such mechanical seals must inventory bulky and expensive spare parts which include mounting flanges.

Conventional mechanical seals are also provided with spacers to maintain axial alignment of the rotating element within the mounting flange, such spacers requiring removal during installation. Frequently, seal members are located in inaccessible and tight spaces, making them difficult to remove and replace while maintaining proper axial alignment and while accessing radial set screws to retain the rotatable element of the seal to the rotatable shaft. Additionally, existing seal assemblies are provided with lubrication passageways which are dead ended at the component to be lubricated, leading to heat damage to the lubricants. There is a need for an improved mechanical seal which may be easily disassembled at the installed location and quickly repaired. A need also exists for a mechanical seal which may be more easily installed on the pump or other rotating machinery and which allows better lubrication and cooling of bearing components.

SUMMARY OF THE INVENTION

This disclosure concerns a cartridge mechanical seal which may be used with pumps or any rotating shaft equipment requiring a liquid to be sealed in the equipment where a drive shaft enters the equipment housing from the outside through a shaft opening that would allow the liquid to leak or drain from the housing. Though pumps are a primary use for such seals, the seals may also be used in a compressor, mixer, fan, reactor, agitator, conveyor or any other rotating shaft equipment.

The improved mechanical seal includes an end plate which receives a seal cartridge, the cartridge including a closely fitting cylindrical stator assembly having an axial opening through it. The stator assembly is received in a central opening in the end plate which is mounted to the housing of the pump or other rotating shaft machinery to be sealed. A rotor assembly is axially received within the cylindrical opening of the stator assembly. Opposing annular faces on the rotor assembly and the stator assembly provide bearing surfaces between the stator assembly and the rotor assembly, those bearing faces being internal to the cartridge. A clamp having a radial gap may be fixed to the rotor assembly after the cartridge has been installed in the end plate and the rotor assembly has been received on the pump drive shaft. The clamp is retained to the rotor assembly by a radial pin and the clamp is clinched around the drive shaft of the pump by a tightening screw which reduces the gap of the clamp. An annular groove in an end face of the stator assembly receives multiple locator pins which are retained in the opposing end face of the clamp. The locator pins space the clamp away from the stator assembly. The end plate and stator assembly have intake and exit openings in registry such that lubricants may flow past the bearing surfaces of the stator assembly and the rotor assembly. Because the clamp has a smaller diameter than the axial opening of the end plate, the end plate may be removed without first removing the clamp and cartridge from the drive shaft thereby facilitating removal of the seal doing during repair.

It is an object of the invention to provide a field repairable mechanical seal for a pump or other rotating shaft machinery.

It is also an object of the invention to provide a mechanical seal which allows disassembly of disposable bearing elements from the mounting flange of the seal.

It is a further object of the invention to provide a mechanical seal which reduces the cost of and space required for inventory of spare seals and eliminates the need to keep mounting flanges as part of seal inventory.

It is yet another object of the invention to provide an improved seal cartridge which may be used on multiple shapes of end plate.

It is also an object of the invention to provide an improved mechanical seal which allows use of a single screw to clamp the seal rotating parts to the pump drive shaft.

It is further an object of the invention to provide a mechanical seal with improved concentricity of the moving and stationary components of the seal.

It is still another object of the invention to provide a seal which allows greater ease and speed of installation along with easier shaft adjustment.

It is a further object to provide a mechanical pump seal which allows removal of the mounting flange without releasing the seal cartridge from the drive shaft.

These and other objects of the invention will become apparent from examination of the description and claims which follow.

DETAILED DESCRIPTION OF THE INVENTION

Figure 1:
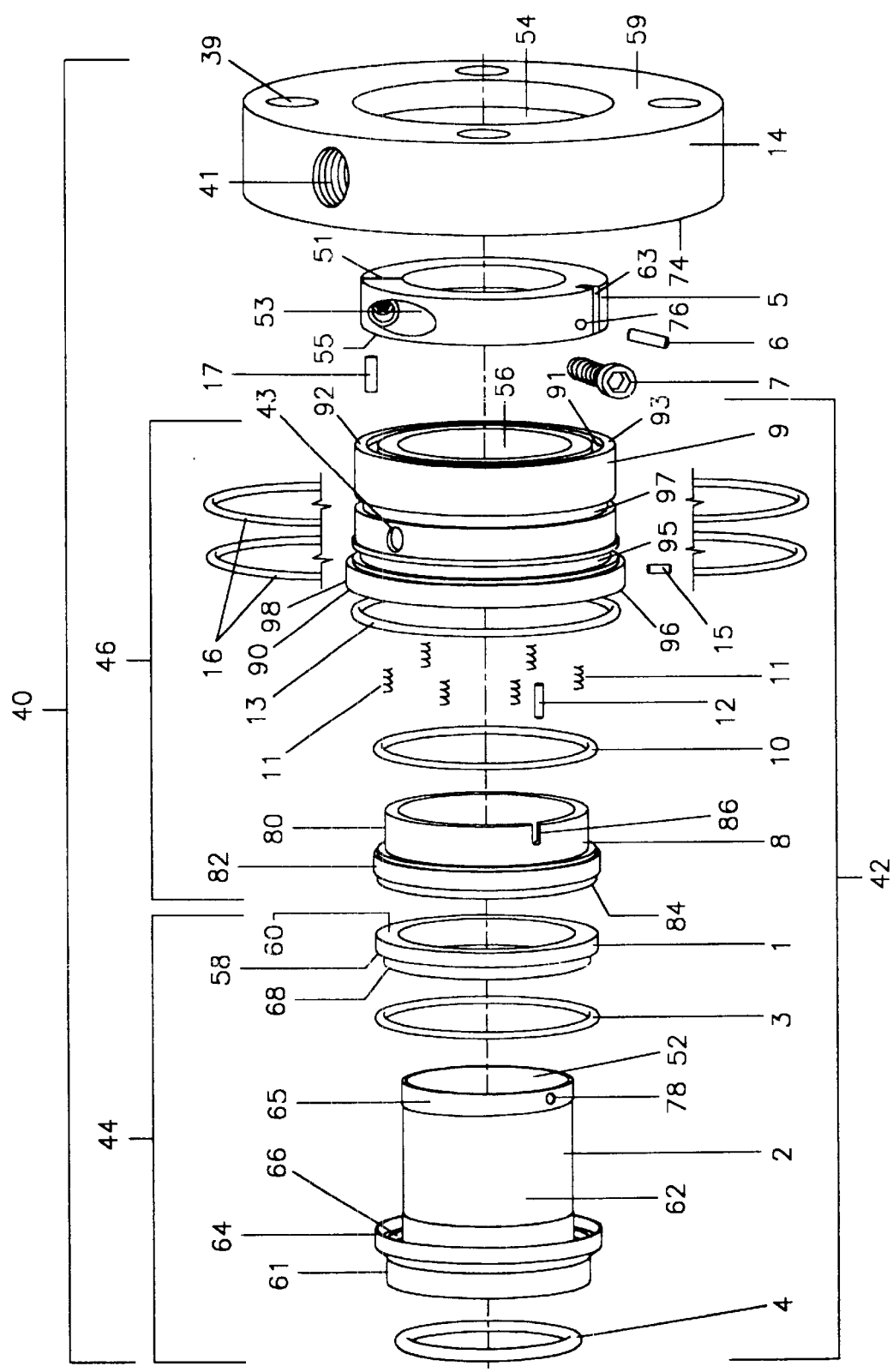
FIG. 1 is an exploded view in perspective of the preferred embodiment of a single seal version of the invention.
Figure 2:
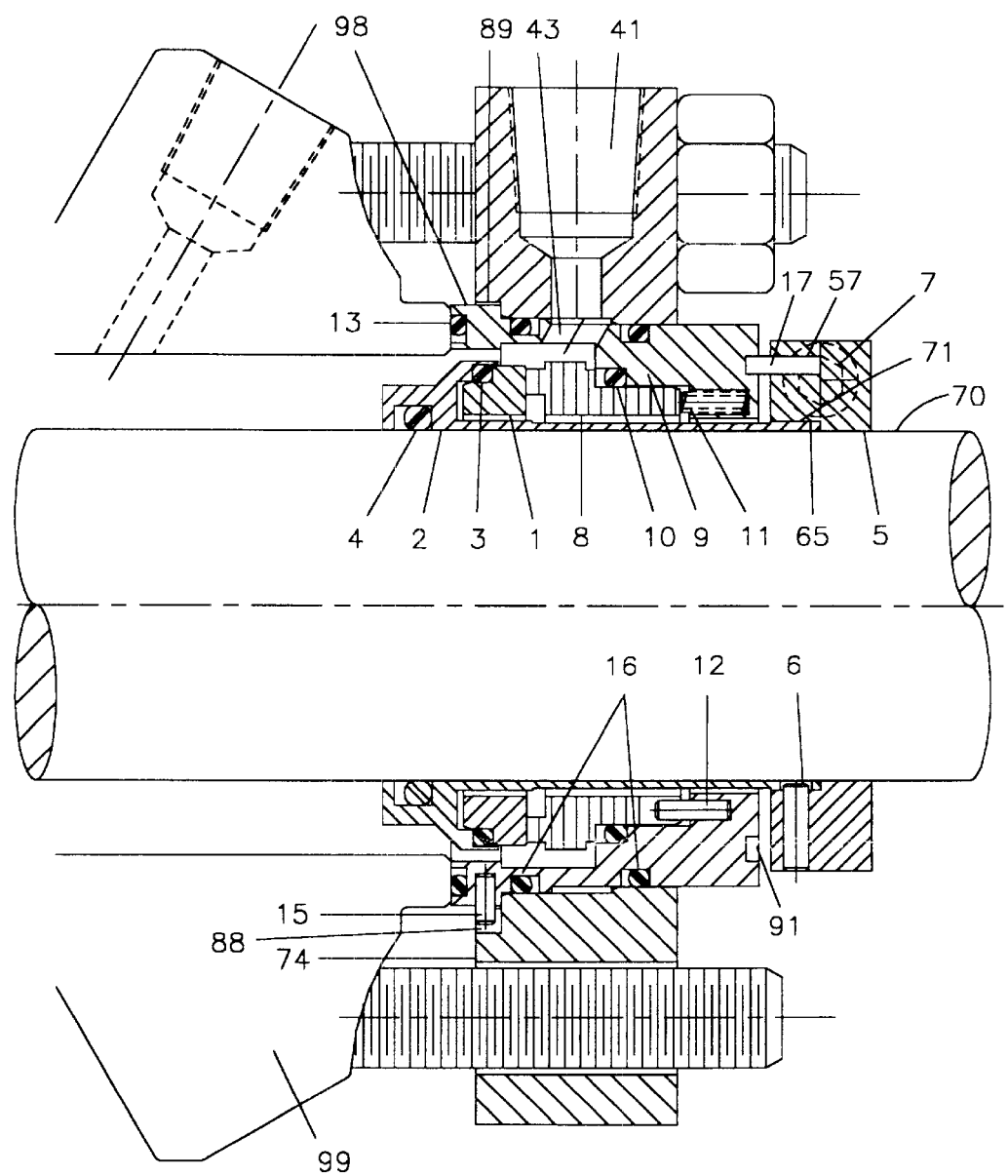
FIG. 2 is a cross section of the preferred embodiment single seal invention of FIG. 1 shown mounted to a pump body.

Referring to FIGS. 1 and 2, the components of the preferred embodiment invention seal 40 may be observed. Seal 40 comprises an end plate 14 and a seal cartridge 42 which is slidably receivable within opening 54 of end plate 14. Seal cartridge 42 includes a rotor assembly 44 which is axially receivable within stator assembly 46 and is coaxial therewith. Pump drive shaft 70 is received within the axial passageway 52 of rotor assembly 44 and is retained to rotor assembly 44 by drive clamp 5 which is accessible from the outside of the pump during installation.

Rotor assembly 44 comprises sleeve 2 which includes a barrel 62 having a radially extending collar 64 fixed annularly thereto, collar 64 having a recess 66 therewithin. Second O-ring 3 is slidably received on barrel 62, in recess 66. Seat member 1 is slidably received on barrel 62 and the extension 68 thereof is received in recess 66 compressing second O-ring 3. First O-ring 4 is received within the enlarged first end 61 of sleeve 2 and will touchingly engage the drive shaft 70 when it is received in passageway 52 thereby sealing drive shaft 70 to sleeve 2. Seat member 1 includes an enlarged shoulder 58 on which is located first bearing face 60.

Stator assembly 46 comprises a housing 9 which receives washer 8 in first end 90 thereof such that cylindrical body 80 of washer 8 may be slidably received within housing 9. Washer 8 is provided with bearing surface 84 which touchingly engages first bearing face 60 of seat member 1 when the cartridge 42 is assembled. At least one lock pin 12 is pressed into a hole in housing 9 and extends therefrom to be receivable by slip fit in slot 86 of cylindrical body 80 to prevent rotation of washer 8 on housing 9. Third O-ring 10 is slidably receivable on cylindrical body 80 and provides sealing contact between cylindrical body 80 and the interior axial cylindrical passageway 56 of housing 9. Springs 11 bias washer 8 toward seat 1 of rotor assembly 44 to providing loading of bearing surface 84 of washer 8 upon first bearing face 60 of seat member 1. In addition to loading bearing surface 84 and bearing face 60, springs 11 help to compensate for variations in dimension in the parts of cartridge 42. Fourth O-ring 13 is received in an annular groove 94 on first end face 96 of housing 9. Fourth O-ring 13 is compressed between housing 9 and the pump body 99 to which end plate 14 is mounted. When barrel 62 of sleeve 2 is fitted in interior axial passageway 56 of housing 9, barrel 62 extends from second end 92 of housing 9 and past outboard side 59 of end plate 14.

Housing 9 comprises a radially extending annular flange 98 at or near first end 90 thereof. Flange 98 abuts counterbore 89 in inboard face 74 of end plate 14 when cartridge 42 is installed in end plate 14. O-ring grooves 95 and 97 along housing 9 receive paired O-rings 16 therein.

When pump drive shaft 70 is received in cartridge 42 and cartridge 42 is installed in end plate 14 as shown in FIG. 2, pump shaft 70 extends from opening 54 of end plate 14. Drive clamp 5 may be placed around drive shaft 70 and one or more pins 6 may be pressed through one or more radial openings 76 and into slip fit in one or more holes 78 of barrel 62 of sleeve 2, thereby locking drive clamp 5 to rotor assembly 44.

Drive clamp 5 includes a radially disposed gap 51 which is narrowed by tightening of cap screw 7 in threaded opening 53 which bridges gap 51 perpendicularly. As gap 51 is narrowed, drive clamp 5 is compressed to clinch drive shaft 70. One or more relief slots 63 may extend radially part way into drive clamp 5 from the outer circumference thereof to facilitate narrowing of gap 51. Preferably relief slots 63 are spaced apart evenly from gap 51, e.g. if two relief slots 63 are used, each will be one hundred twenty degrees away from gap 51. Gap 51 and relief slots are preferably one-half to two millimeters in width.

Multiple locator pins 17 are pressed into holes 57 in inboard face 55 of drive clamp 5. Locator pins 17 extend from inboard face 55 of drive clamp 5 and are received in annular groove 91 of end face 93 of second end 92 of housing 9. The centers of holes 57 are concentric to the annular groove 91. The use of multiple locator pins 17, preferably three locator pins 17, facilitates coaxial attachment of stator assembly 46 and rotor assembly 44 to drive shaft 70 to assure concentricity of the seal 40 to drive shaft 70. Each of locator pins 17 is longer than the depth of holes 57 and groove 91 such that drive clamp 5 remains spaced apart from stator assembly 46. Locator pins 17 are preferable of polymeric material such as nylon and may remain in place after assembly.

End plate 14 is provided with lubrication passageway 41 which is maintained in registry with radial lubrication opening 43 of housing 9 due to the action of pin 15 which extends from housing 9 and is received in notch 88 in rear face 74 of end plate 14. The seal 40 may be retained to the pump body 99 by bolts received in mounting openings 39 of end plate 14.

The multiple seal design of FIGS. 3 and 4 contains two sets of faces as will be described below but may contain more sets of faces. In a multiple seal arrangement the term "inboard" refers to the seal nearest the pumped fluid and "outboard" refers to the seal nearest the exterior of the pump. "Buffer fluid" refers to an external fluid being introduced between the inboard and outboard sets of seals.

Figure 3:
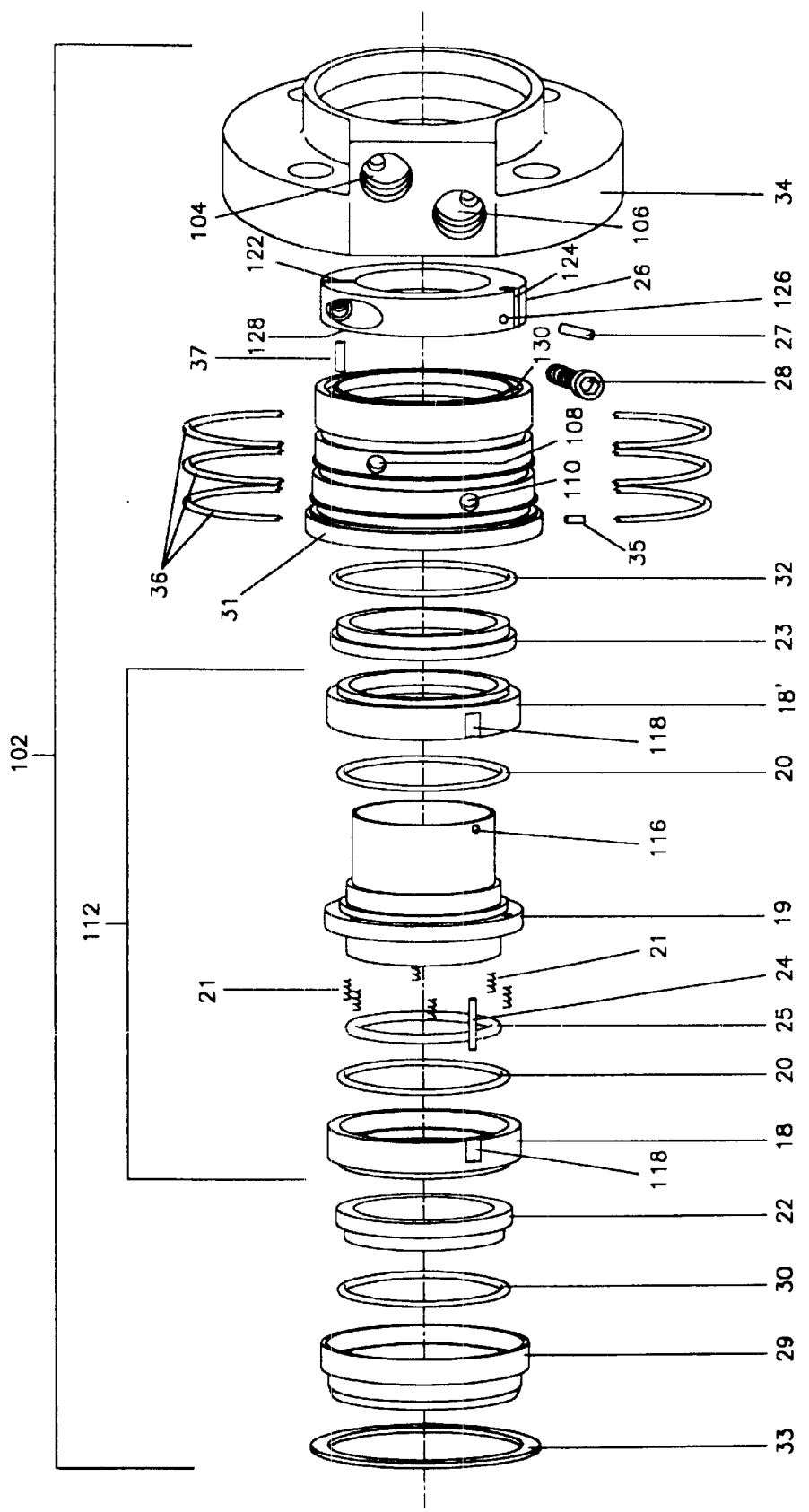
FIG. 3 is an exploded view in perspective of the preferred embodiment of a double seal version of the invention.
Figure 4:
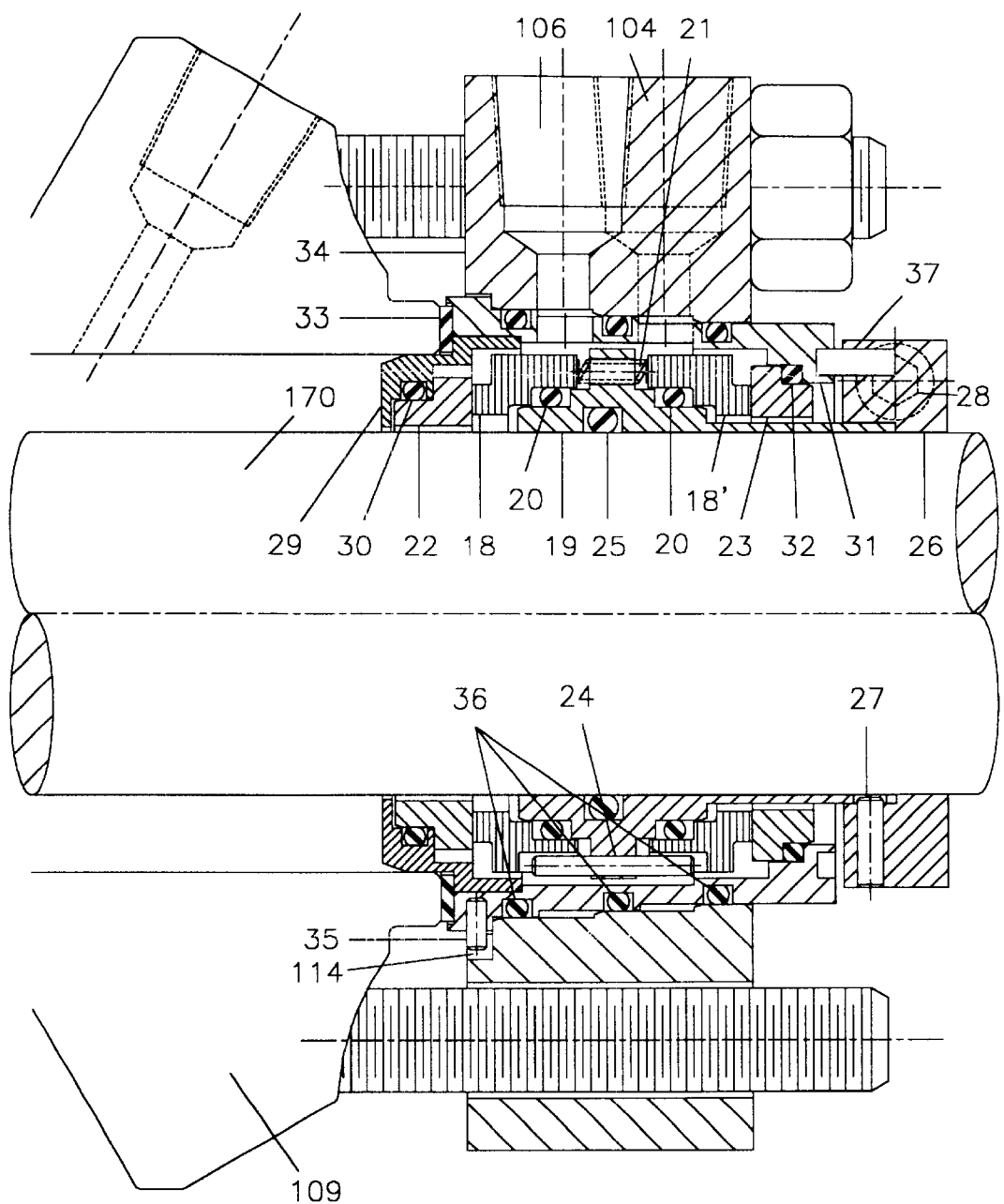
FIG. 4 is a cross section of the preferred embodiment double seal invention of FIG. 3 shown mounted to a pump body.

In the double seal embodiment of FIGS. 3 and 4, the inboard set of faces (on washer 18 and inboard seat 22) is used to keep a buffer fluid from entering the fluid being pumped. The outboard set of faces (on washer 18' and outboard seat 23) is used to seal the buffer fluid from leaking into the atmosphere. In this case, the buffer fluid would be at higher pressure than the pumped fluid. This double seal embodiment allows the buffer fluid to be used to lubricate and cool the sliding surfaces of washer 18 and inboard seat 22 and to keep the pumped fluid completely isolated from escaping from the pump due to its lower pressure. The seal of FIGS. 3, 4 may be used in application where the pumped fluid is either a poor lubricant for the seal faces or is too hazardous to be allowed to escape to the environment.

The double seal embodiment of FIGS. 3 and 4 may be used in tandem where the inboard set of faces is used to seal the fluid being pumped. The outboard set of faces is used to seal the buffer fluid from leaking into the atmosphere as in the double seal arrangement. The tandem arrangement is used for several reasons: (a) to wash away the pumped fluid from the inboard faces as they leak to prevent damage to the atmospheric side of the seal; (b) to keep the leaking pumped fluid contained preventing it from entering the atmosphere;

(c) To provide additional cooling to the inboard faces; and (d) to reduce the pressure in stages from the pumped fluid pressure reducing down to atmospheric pressure.

The structure of the double seal arrangement is described below, reference being made to FIGS. 3 and 4 wherein identical parts are referenced identically. Washers 18, 18' are mounted onto sleeve 19 with a slip fit using O-rings 20 to seal the inboard washer 18 and outboard washer 18' to the sleeve 19. The washers 18 and 18' also float on the sleeve 19 on a spring or springs 21. The springs 21 serve two purposes. First, they are used to mechanically load the washers 18, 18' against the seats 22 and 23 respectively to form the primary seals. Second, they allow the washers 18, 18' to align themselves to the seats 22, 23 to compensate for variations in the dimensions in the seal parts and the equipment to which the seal is mounted. A pin or pins 24 are pressed into the sleeve 19 and engage with a slip fit into matching slots 118 in the washers 18, 18' to cause the washers 18, 18' to turn with the sleeve 19. The sleeve 19 is mounted on the shaft 170 with a slip fit using an O-ring 25 to seal the sleeve 19 to the shaft 170.

The sleeve 19 extends through the stationary portion of the mechanical seal (stationary housing 31 and end plate 34) and is then attached to a drive clamp 26 that is accessible from the outside of the pump during installation. The drive clamp 26 and sleeve 19 slip fit together and have matching radial holes 126, 116 respectively that are secured together using tension pin or pins 27 that are press fit into the hole 126 in the drive clamp 26 and slip fit into the hole 116 in the sleeve 19.

The drive clamp 26 is the final means of attaching the rotating faces of the mechanical seal to the drive shaft 170. A cap screw 28 compresses the drive clamp 26 radially to the shaft 170. A narrow radial void 122 in the drive clamp 26 and relief slots 124 in the circumference thereof allow the drive clamp 26 to be compressed to conform to the shaft 170 creating a friction drive. Relief slots 124 extend from the outer circumference wall of drive clamp 26 part way into drive clamp 26. Drive clamp 26 locates the washers/sleeve assembly 112 axially in relation to the seats 22, 23 and drives the washers/sleeve assembly 112 with the shaft rotation.

The inboard seat 22 and outboard seat 23 are mounted to the equipment housing 109 as follows: The inboard seat 22 is mounted into a housing adapter 29 using an O-ring 30 to seal the parts together. The outboard seat 23 is mounted into the stationary housing 31 using an O-ring or gasket 32 to seal the parts together. The housing adapter 29 and stationary housing 31 are press fit together with the washer/sleeve assembly 112 and drive clamp 26 sandwiched in between them so the washers 18, 18' and seats 23, 23 are mechanically loaded in contact with each other to form the inboard and outboard sets of primary seal faces. The housing adapter 29 and stationary housing 31 are clamped to equipment housing 109 using an O-ring or gasket 33 to seal the parts together.

The end plate 34 is used to clamp the stationary housing 31 to the equipment housing 109 utilizing bolts or studs on the equipment housing 109 thus keeping the stationary housing 31 and end plate 34 stationary in relation to each other. The end plate 34 also serves as the means to connect piping (not shown) to the seal 102 to permit buffer fluid to pass through ports 104, 106 through the end plate 34 to aligned ports 108, 110 in the stationary housing 31. A pin 35 is press fit into the stationary housing 31 and slip fits into a matching notch 114 in the end plate 34 to locate the ports 108, 110 in the stationary housing 31 in registry with the ports 104, 106 in end plate 34. The stationary housing 31 is a slip fit into the end plate 34 and is sealed to the end plate 34 to isolate each port by means of three O-rings 36.

Finally, the assembled rotating unit containing the washers 18, 18', sleeve 19, and drive clamp 26; and the assembled stationary unit containing the seats 22, 23, housing adapter 29, stationary housing 31, and end plate 34 are aligned to each other by means of spacer pins 37. The spacer pins 37 are elongate pins, preferably plastic. The spacer pins 37 are press fitted into holes in the inboard face 128 of the drive clamp 26 and fit snugly into a corresponding groove 130 in the outboard face 132 of the stationary housing 31. The holes in inboard face 128 and groove 130 in outboard face 132 are machined so the centerline of the holes is concentric to the diameter of the groove 130. When the mechanical seal is mounted on the shaft 170, the drive clamp 26 is centered to the shaft 170 and the spacer pins 37 keep the stationary housing 31 centered to the drive clamp 26 and thus to the shaft 170. The spacer pins 37 are longer than the collective depth of the holes on inboard face 128 of drive clamp 26 and the depth of groove 130, thereby serving to space drive clamp 26 from stationary housing 31 during operation. Spacer pins 37 need not be removed during operation.

Preferably a radial enlargement 71 is formed in drive clamp 5 to receive second end 65 of sleeve 2.

Although the present invention has been illustrated and described in connection with the example embodiments it should be understood that this is illustrative of the invention and by no means restrictive thereof. It is to be expected that those skilled in this art can make numerous revisions and adaptations of the invention and it is intended that such revisions and adaptations will be included in the scope of the following claims.

Having described the invention, I claim:

1. A mechanical seal for a rotating shaft machine having a drive shaft extending therefrom, comprising a mounting flange having an opening therethrough, the mounting flange having an inboard face and an outboard face, a cartridge member slidably receivable in the opening of the mounting flange, the cartridge member comprising a stationary member and a rotational member, the stationary member nonrotatable within the opening of the mounting flange, the stationary member having an annular bearing face, the rotational member having an annular bearing face opposing the annular bearing face of the stationary member, the bearing face of the stationary member touchingly engaging the annular bearing face of the rotational member and rotatably slidable thereon, the rotational member axially rotatable relative to said stationary housing, the rotational member extending from said stationary housing, a drive clamp selectively fixable to the rotational member, the drive clamp receiving the drive shaft of the rotating shaft machine and selectively mountable thereto, the drive clamp spaced apart from the stationary member, the drive clamp having a diameter smaller than the diameter of the opening of the mounting flange, whereby the mounting flange may be removed from the rotating shaft machine and from the cartridge member and the drive clamp without detaching the drive clamp from the drive shaft.

2. The mechanical seal of claim 1 wherein the stationary member has an annular enlargement along the length thereof, the annular enlargement of the stationary member abutting the inboard face of the mounting flange and compressed between the mounting flange and the rotating shaft machine when the mounting flange is mounted to the rotating shaft machine.

3. The mechanical seal of claim 1 wherein the drive clamp has a drive shaft receiving passageway therethrough, the drive clamp having a radial gap therethrough extending from the passageway therein to the exterior thereof, a drawing element selectively narrowing the radial gap to tighten the clamp about the drive shaft.

4. The mechanical seal of claim 1 comprising a radially disposed opening in the drive clamp for receiving a pin, and wherein
the pin is received in an opening in the rotational member to retain the clamp to the rotational member.

5. The mechanical seal of claim 3 wherein the drive clamp includes one or more radial relief slots, each of the one or more radial relief slots extending partially radially through the drive clamp from the exterior thereof.

6. The mechanical seal of claim 1 wherein the drive clamp having an inboard face, the inboard face having a plurality of pins extending therefrom, each of said plurality of pins disposed radially equidistant from the axis of the passageway through the clamp, the stationary member having an outboard face opposing the inboard face of the drive clamp, the outboard face of the stationary member includes an annular groove thereon, the plurality of pins slidable in the annular groove of the outboard face of the stationary member, whereby coaxial alignment of the rotational member to the stationary member is facilitated.

7. The mechanical seal of claim 6 wherein each of the pins of the plurality of pins is constructed of polymeric material, said plurality of pins spacing said drive clamp from said stationary member.

8. The mechanical seal of claim 1 wherein the mounting flange has at least one radial passageway from the exterior thereof to the opening therein, the stationary member having an axial cylindrical passageway therethrough, the rotational member slidably receivable in said axial cylindrical passageway of said stationary member, the stationary member includes at least one radial opening therethrough, the at least one radial opening of said stationary member in registry with the at least one radial passageway of the mounting flange when the stationary member is installed in the mounting flange, whereby fluid may be passed to the axial cylindrical passageway of the stationary member.

9. The mechanical seal of claim 1 wherein the rotational member includes a sleeve having a collar annularly extending therefrom, the collar having a side recess therein, an annular seat element slidably receivable on said sleeve and in said recess, the bearing face of the rotational member disposed on the annular seat element.

10. The mechanical seal of claim 1 wherein the stationary member has an annular enlargement along the length thereof, the annular enlargement of the stationary member abutting the inboard face of the mounting flange and compressed between the mounting flange and the rotating shaft machine when the mounting flange is mounted to the rotating shaft machine, the drive clamp has a drive shaft receiving passageway therethrough, with a radial gap therethrough extending from the passageway therein to the exterior thereof, wherein a drawing element selectively narrows the radial gap of the drive clamp to tighten the clamp about the drive shaft, the drive clamp further includes one or more radial relief slots, each of the one or more radial relief slots extending partially radially through the drive clamp from the exterior thereof, a radially disposed opening in the drive clamp receives a radial pin, the radial pin is further received in an opening in the rotational member to retain the clamp to the rotational member, the drive clamp has an inboard face, the inboard face having a plurality of locator pins extending therefrom, each of said plurality of locator pins disposed equidistant from the axis of the passageway through the clamp, the stationary member has an outboard face opposing the inboard face of the drive clamp, the outboard face of the stationary member includes an annular groove thereon, the plurality of locator pins are slidable in the annular groove of the outboard face of the stationary member, wherein each of the locator pins of the plurality of locator pins is constructed of polymeric material, said plurality of locator pins space said drive clamp from said stationary member, and the mounting flange has at least one radial passageway from the exterior thereof to the opening therein, the stationary member has an axial cylindrical passageway therethrough, the rotational member is slidably receivable in said axial cylindrical passageway of said stationary member, the stationary member includes at least one radial opening therethrough, and the at least one radial opening of said stationary member in registry with the at least one radial passageway of the mounting flange when the stationary member is installed in the mounting flange.

11. A mechanical seal for a rotating shaft machine having a drive shaft extending therefrom, comprising a mounting flange having a cylindrical opening therethrough, the mounting flange having an inboard face and an outboard face, a cartridge member slidably receivable in the cylindrical opening of the mounting flange, the cartridge member comprising an outer stationary housing and an inner rotational member, the stationary housing having a cylindrical axial passageway therethrough, the rotational member slidably receivable within the cylindrical axial passageway of said stationary housing and axially rotatable therewithin, the rotational member extending from the outboard end of said stationary housing when the rotational member is fully received in the stationary housing, the rotational member having an inboard end and an outboard end and an annular extension fixed along the length thereof, the annular extension including a bearing face thereon, the stationary housing having a bearing face opposing the bearing face of the annular extension of the rotational member, the bearing face of the rotational member abutting the bearing face of the stationary housing when the rotational member is fully received in the stationary housing, said rotational member is selectively attachable to the drive shaft, the mounting flange removable from the cartridge without detaching the rotational member from the drive shaft.

12. The mechanical seal of claim 11 wherein the stationary housing has an inboard end and an outboard end, the rotational member slidably receivable within the cylindrical axial passageway only from the inboard end of said stationary housing.

13. The mechanical seal of claim 12 wherein a drive clamp is selectively fixed to said rotational member, the drive clamp having an axial passageway therethrough for selectively receiving the drive shaft, the drive clamp compressible to grip the drive shaft, the drive clamp spaced apart from the stationary housing, the drive clamp sized to pass through the cylindrical opening of the flange.

14. The mechanical seal of claim 13 wherein the drive clamp has an inboard face having a multiplicity of pins fixed thereto and extending therefrom toward the stationary housing, each of the multiplicity of pins spaced radially equidistant from the axis of the axial passageway through said drive clamp, the stationary housing having an outboard end face with an annular groove thereon, each of the multiplicity of pins received in the annular groove of the stationary housing.

15. The mechanical seal of claim 14 wherein the drive clamp has a radially disposed gap extending therethrough from the passageway thereof to the exterior thereof, a drawing member selectively urging reduction in said gap to compress the drive clamp about the drive shaft.

16. A drive clamp for locking a mechanical seal to a drive shaft of a rotating machine comprising an integral cylindrical body having a cylindrical axial passageway therethrough, the cylindrical body having a single radially disposed gap extending therethrough from the passageway thereof to the exterior thereof, said gap having opposing first and second sides, a drawing member disposed to selectively urge the first side of said gap toward the second side of said gap, whereby the passageway of said cylindrical body may be effectively reduced in diameter.

17. The drive clamp of claim 16 wherein said cylindrical body has an opening generally perpendicular to said gap, said opening intersecting said gap, said opening having threads therein on the first side of said gap, a cap screw receivable within said opening to selectively draw said first side of said gap toward the second side of said gap.

18. The drive clamp of claim 16 wherein said body has at least one relief void radially disposed therein, the at least one relief void extending radially from the exterior of said body less than fully through said body.

19. The drive clamp of claim 16 wherein said body has an inboard side and an outboard side, said body having a spacer element abutting the inboard side thereof, said spacer element defining a circle concentric to the axis of said passageway of said body, said spacer element touchingly engageable with said mechanical seal.

20. The drive clamp of claim 19 wherein said spacer element comprises a multiplicity of locator pins extending generally perpendicularly from the inboard side of said body, each of said locator pips is disposed radially equidistant from the axis of said cylindrical axial passageway through said body, said mechanical seal has an outboard face having an annular groove thereon, each of said locator pins being received in said annular groove, and said multiplicity of locator pins space said drive clamp from said end face of said mechanical seal.

* * * * *